(No Model.) 2 Sheets—Sheet 1.
T. J. LINDSAY.
BICYCLE DRIVING MECHANISM.
No. 545,408. Patented Aug. 27, 1895.
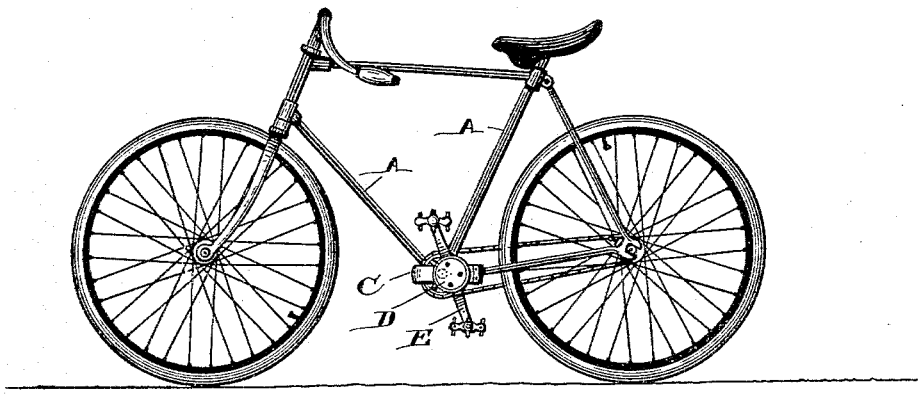
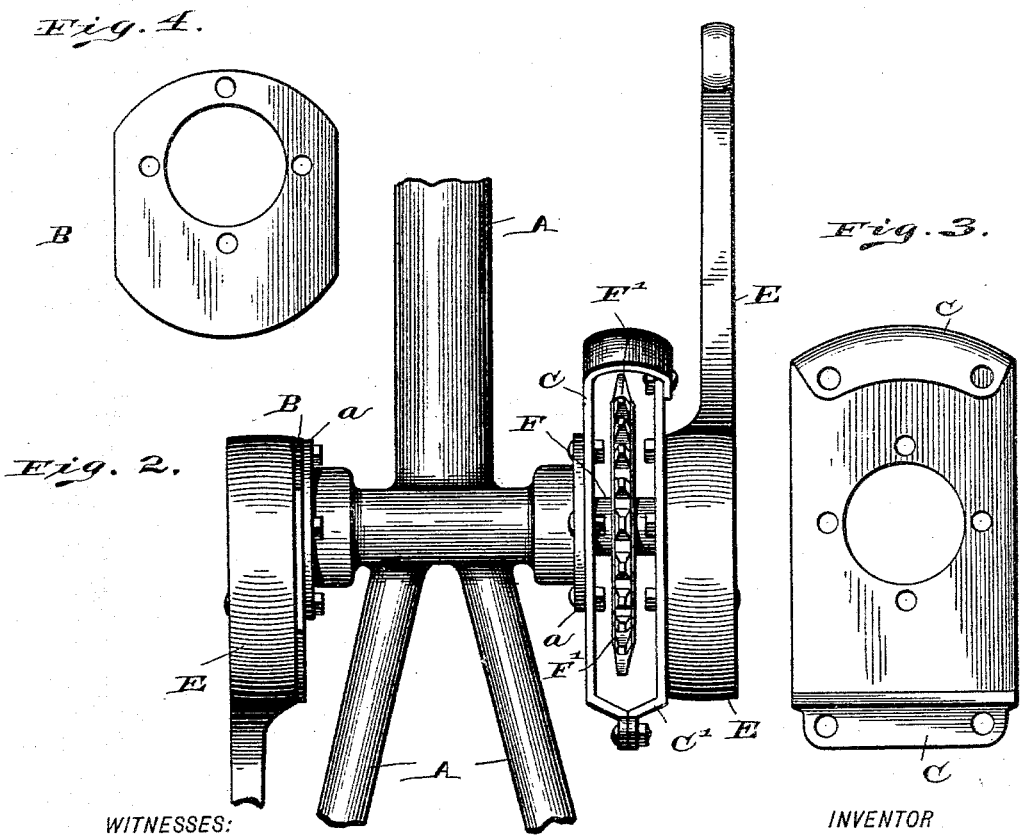
WITNESSES:
INVENTOR
Thomas J. Lindsay,
BY Chester Bradford,
ATTORNEY.

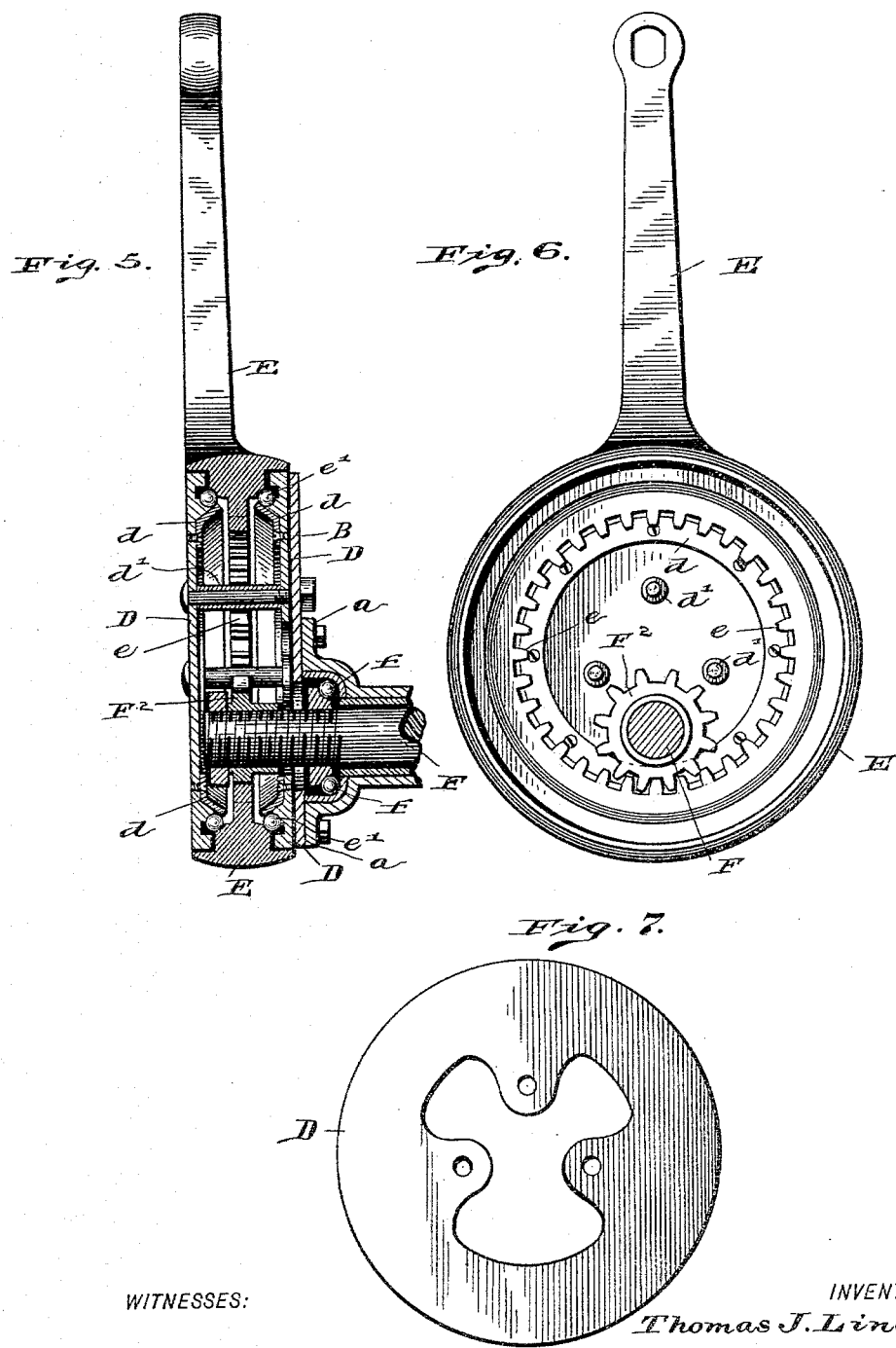

UNITED STATES PATENT OFFICE.

THOMAS J. LINDSAY, OF LAFAYETTE, INDIANA.

BICYCLE DRIVING MECHANISM.

SPECIFICATION forming part of Letters Patent No. 545,408, dated August 27, 1895.

Application filed October 9, 1894. Serial No. 525,352. (No model.)

*To all whom it may concern:*

Be it known that I, THOMAS J. LINDSAY, a citizen of the United States, residing at Lafayette, in the county of Tippecanoe and State of Indiana, have invented certain new and useful Improvements in Bicycle Driving Mechanism, of which the following is a specification.

The principal object of my invention is to produce a bicycle driving mechanism by which increased speed may be attained with a less number of foot motions.

It principally consists in providing the pedal-arms with rings carrying internal gears, which engage with smaller pinions on the pedal-shaft, the result being that the shaft performs two or more revolutions to each revolution of the pedals.

A bicycle provided with mechanism embodying my said invention will be first fully described and the novel features thereof then pointed out in the claims.

Referring to the accompanying drawings, which are made a part hereof, and on which similar letters of reference indicate similar parts, Figure 1 is a side elevation of a bicycle provided with driving mechanism embodying my said invention; Fig. 2, an under side plan of a portion of the driving mechanism and a fragment of the frame in which the pedal-shaft has its bearings; Figs. 3 and 4, plan views of the plates secured to the casings inclosing the mechanism of my invention, said plates being intermediate said casings and the ordinary inclosing-casing for the shaft; Fig. 5, a sectional view through one of the casings within which the mechanism is situated; Fig. 6, a side elevation with one side plate removed, showing the interior; and Fig. 7, a separate view of a side plate, showing a preferred form.

In said drawings the portions marked A represent the framework of the bicycle; B, an interposed plate between said framework and the casing of the mechanism at one end of the pedal-shaft; C C', a frame or shield serving a similar purpose at the other end, but formed, as shown, to pass around the sprocket-wheel on the pedal-shaft; D, a stationary casing made fast to the frame A through the medium of the parts B or C and C'; E, the pedal-arms, including the ring with its internal gear, and F the ordinary pedal-shaft.

The frame A is or may be of any usual or desired form. At the extreme ends of the usual casing for the pedal-shaft forming part of said frame there are flanges *a*, to which the parts B and C may be conveniently connected, thus securing that the frame and said parts when assembled together shall be entirely rigid.

The parts B, C, and C' are of any desired form suitable for the purpose. The forms shown in Figs. 2, 3, and 4 are convenient and desirable forms. They serve merely to unite the frame A and the sides of the structure D rigidly, the part B being interposed directly between them and the parts C C' serving to pass around the ordinary chain or sprocket wheel F' on the pedal-shaft.

The structures D essentially consist, respectively, of two plates bolted to each other and to the parts B and C'. Each of these plates contains a ball-race, as indicated most plainly in Fig. 5, and there are preferably guard-strips *d* to hold the balls in place, as also shown in said figure. Sleeves or corresponding standards *d'* surround the bolts which unite these sides together, and thus hold said sides the predetermined distance apart. The pedal-arms E are continued into rings, as shown, and the central portions of these rings extend down between the plates D and form rims, which are provided with teeth *e*, and become internal gears, as shown most plainly in Figs. 5 and 6, which gears engage with the pinions $F^2$ on the shaft F. The ring portions of these pedal-arms are preferably flanged out, as shown most plainly in Fig. 5, to cover the edges of the plates D, and thus make, as nearly as may be, joints which will exclude the dirt and dust, although there must necessarily be looseness enough at these points to avoid friction, as the entire weight and pressure should go upon the balls *e'*.

The shaft F is the usual pedal-shaft, bearing near one end the usual sprocket or chain wheel F' and at or near the extreme ends the pinions $F^2$, as best illustrated in Figs. 5 and 6. These pinions are rigidly mounted on the shaft and engage with the internal gear formed in the rings of the pedal-arms, and thus, when said pedal-arms are turned, said shaft is revolved at a greater speed than said arms, as will be readily understood, and the result is that the rider is enabled to drive his bicycle at a high speed, without great rapidity of foot motion or pedaling, and still maintain the usual suitable proportions of sprocket-wheels and chain belt.

As will be seen by an inspection of the drawings, particularly Figs. 2 and 5, the entire weight and pressure of the pedals is carried by the frame A through the ball-races in the casings D and the balls $e'$ therein, and thus the pedal-shaft F is entirely relieved of the strain and friction occasioned by the pedaling, which is present in ordinary constructions. The balls $f$ in the ball-races surrounding the pedal-shaft only carry such friction as results from the driving of the shaft itself through the gears. The ball-races which carry the pedaling pressure and force are much longer than those which carry the shaft, and so the friction is better distributed and the loss of power by said friction thus greatly reduced, to the manifest great advantage of the machine.

Having thus fully described my said invention, what I claim as new, and desire to secure by Letters Patent, is—

1. The combination, in a bicycle driving mechanism, of the pedal shaft mounted in the usual surrounding shell forming part of the bicycle frame, and provided with pinions upon its ends, and the usual sprocket or chain wheel; structures secured to the shell by suitable interposed parts, one of which incloses or forms a shield for the sprocket wheel or chain; ball races in said structures; rings surrounding said structures, and bearing on the balls in said ball races, and extending out and forming the pedal arms, said rings being provided with internal gears which engage with the pinions on the pedal shaft; and guard strips which hold the balls from dropping out of place when the sides of the structure may be removed, substantially as shown and described.

2. The combination, in a bicycle driving mechanism, of the pedal shaft mounted in suitable bearings in a surrounding shell or casing forming part of the bicycle frame, and provided with pinions upon its ends, and the usual sprocket or chain wheel; structures secured to the shell by suitable interposed parts, one of which incloses and forms a shield for the sprocket or chain wheel; ball races in said structures; rings surrounding said structures, and bearing on the balls in said ball recesses, and extending out and forming the pedal arms, said rings being provided with internal gears which engage with the pinions on the pedal shaft; said several parts being arranged and operating substantially as set forth.

3. The combination, in a bicycle driving mechanism, of the usual pedal shaft; pinions on the ends of said pedal shaft; a casing structure secured to the bicycle frame-work composed of two sides united together by transverse rivets or bolts, and each having near the upper end one side of a ball race; and pedal arms formed at their inner ends into rings embodying internal gears adapted to engage with and drive said pinions, and provided with surfaces on each side of said gears which form the other sides of said ball races; and balls inserted in said ball races; each group of mechanism being thus provided with two ball races, one on each side of the engaging gears, substantially as shown and described.

In witness whereof I have hereunto set my hand and seal, at Indianapolis, Indiana, this 4th day of October, A. D. 1894.

THOMAS J. LINDSAY. [L. S.]

Witnesses:
CHESTER BRADFORD,
JAMES A. WALSH.